Aug. 27, 1946. R. G. LE TOURNEAU Re 22,783

SCRAPER

Original Filed Dec. 16, 1932 5 Sheets-Sheet 1

INVENTOR

R. G. Le Tourneau

BY

ATTORNEY

Aug. 27, 1946. R. G. LE TOURNEAU Re 22,783

SCRAPER

Original Filed Dec. 16, 1932 5 Sheets-Sheet 2

INVENTOR

R. G. Le Tourneau

BY

ATTORNEY

Aug. 27, 1946. R. G. LE TOURNEAU Re 22,783

SCRAPER

Original Filed Dec. 16, 1932 5 Sheets-Sheet 3

INVENTOR

R. G. Le Tourneau

BY

ATTORNEY

SCRAPER

Original Filed Dec. 16, 1932 5 Sheets-Sheet 4

INVENTOR
R.G.LeTourneau
BY
ATTORNEY

Aug. 27, 1946. R. G. LE TOURNEAU Re 22,783
SCRAPER
Original Filed Dec. 16, 1932 5 Sheets-Sheet 5
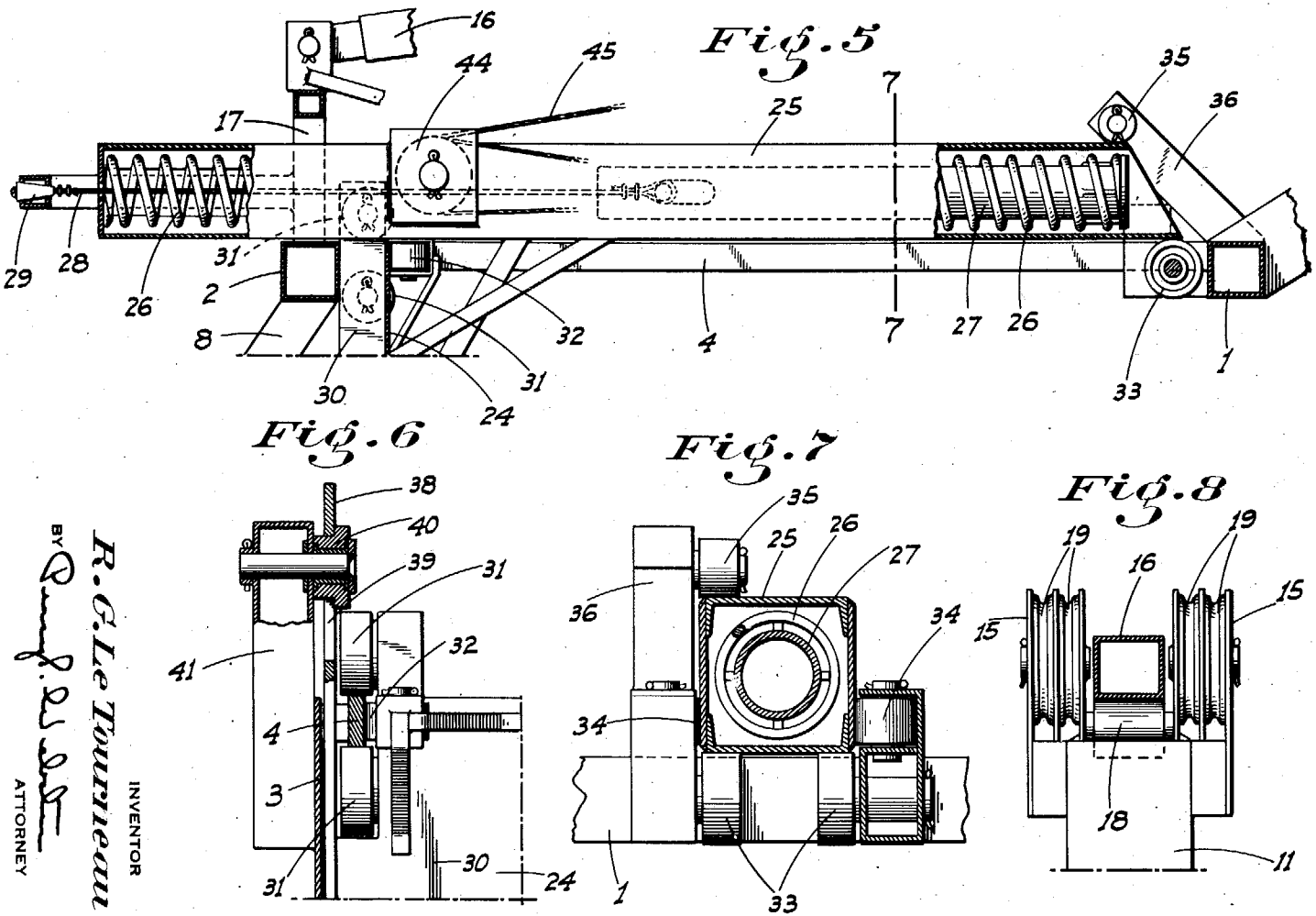
INVENTOR
R. G. Le Tourneau
BY
ATTORNEY Reissued Aug. 27, 1946

Re. 22,783

UNITED STATES PATENT OFFICE 22,783

SCRAPER

Robert G. Le Tourneau, Peoria, Ill., assignor to R. G. Le Tourneau, Inc., Stockton, Calif., and Peoria, Ill., a corporation of California Original No. 1,963,665, dated June 19, 1934, Serial No. 647,529, December 16, 1932. Application for reissue March 19, 1946, Serial No. 655,531

23 Claims. (Cl. 37—126)

This invention relates to scrapers of the large capacity tractor-drawn type, and has certain features in common with the scraper shown in my Patent No. 1,857,157, dated May 10, 1932; in which the dirt after being loaded and transported to the desired point is discharged by the forward movement of a rear end or pusher gate.

As far as I am aware all scrapers heretofore have been constructed on the theory that the dirt could only be loaded into the scraper bowl to the rear of the scraping blade, with the forward movement of the implement. Due to the enormous and constantly increasing resistance to rearward movement offered by a mass of dirt as the loading proceeds and the bulk of dirt increases, it has been assumed that a large capacity scraper could only be obtained by a great width or depth of the bowl, which without some means to aid the loading action required the use of an almost prohibitive amount of power.

In my Patent No. 1,891,266, dated December 20, 1932, I provided such an aid to loading a large capacity scraper by the use of a rearwardly pushing front endgate, designed to bodily push a mass of dirt back into the bowl after it had been scraped, so as to clear the front portion of the bowl for the reception of a further mass of dirt. I also provided a loading aid by making the bowl of a telescopic character, as shown in my Patent No. 1,530,779, dated March 24, 1925. In the first case great power was necessary to push the mass of dirt back bodily, and in the second case an excessively long, unwieldly and somewhat complicated structure was necessary.

I have since found however that most varieties of dirt, after a certain amount of the same has been piled up into the bowl back of the scraper blade, and thereby setting up a certain resistance to further rearward movement, tends of itself to tumble or slide forwardly with a continued action of the scraper blade against the ground. I have taken advantage of this discovery by the provision of a dirt receiving member or auxiliary bowl ahead of the blade so arranged relative thereto as not to interfere with the action of said blade, and so that the scraper in effect is loaded at the middle instead of at its forward end. In this manner the total mass of dirt moves a minimum distance from the point where it leaves the ground or is scraped up, and this feature forms the main object of the present invention.

A further object of the invention is to so mount and operate this auxiliary bowl in connection with the rear end pusher gate that said bowl will be automatically moved to a discharge position ahead of any movement of the gate. In this manner the two sections of the bowl are relieved of their loads in succession and evenly without any tendency to clog up the dirt outlet as would be the case if an excessively large quantity of dirt were discharged all at one time.

A further object is to provide what I believe to be a novel means for supporting the bowl for vertical adjustment in such a manner that a minimum of power is necessary to effect such adjustment.

These objects I accomplish by means of such structure and relative arrangement of parts as will fully appear by a perusal of the following specification and claims.

In the drawings similar characters of reference indicate corresponding parts in the several views:

Fig. 5 is an enlarged longitudinal view of the endgate supporting beam and adjacent parts partly in section.

Fig. 6 is an enlarged fragmentary cross section on the line 6—6 of Fig. 1.

Fig. 7 is a similar view taken on the line 7—7 of Fig. 5.

Fig. 8 is a similar view taken on the line 8—8 of Fig. 3.

Figure 1:
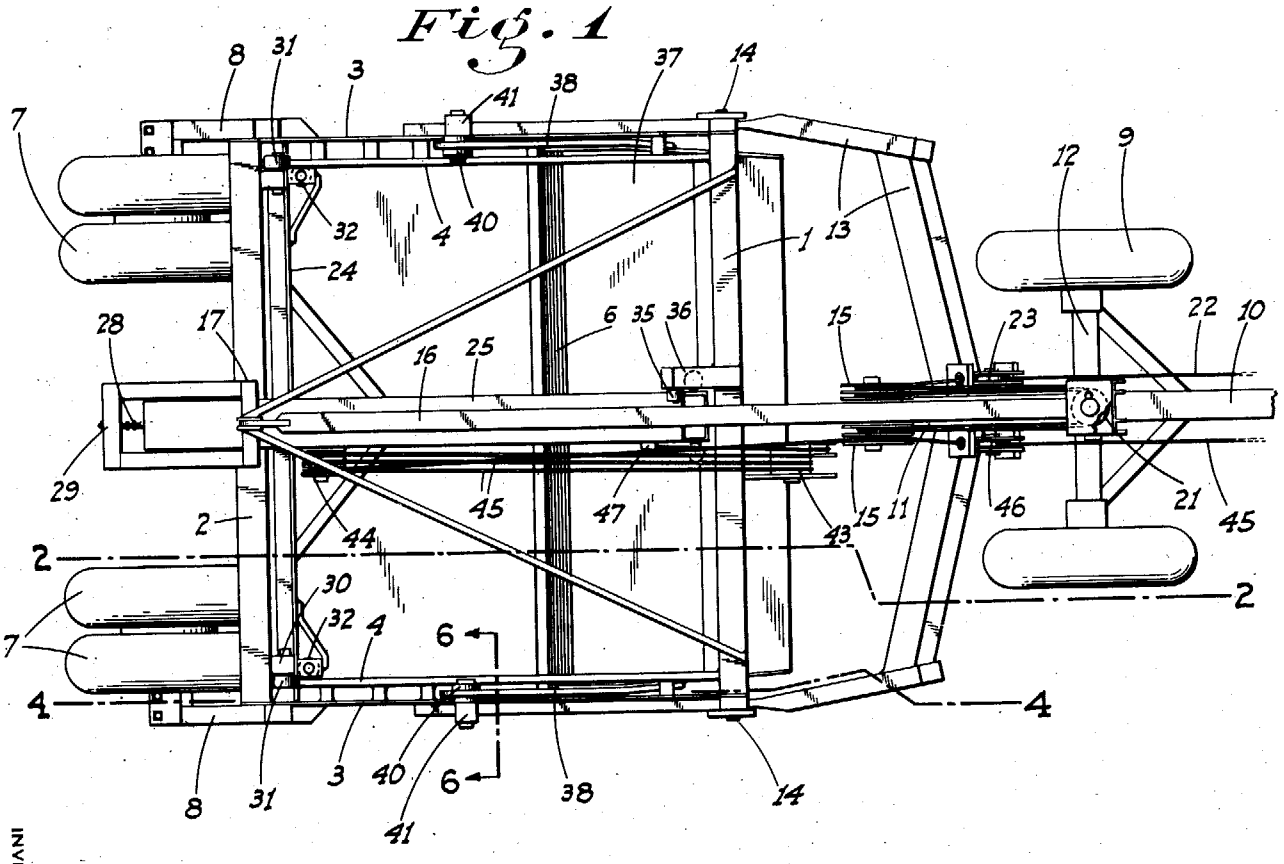
Figure 1 is a top plan view of my improved scraper.

Referring now more particularly to the characters of reference on the drawings, the numerals 1 and 2 denote transverse front and rear frame beams which are connected by the depending side walls 3 of the main scraper bowl and by rails 4 extending along the top edges of and spaced inwardly from said side walls. The bottom 5 of the scraper extends forwardly from the rear ends of the side walls and terminates substantially central of the length of said walls in a downwardly sloping scraper blade 6. The bowl is supported at its rear end on wheels 7 disposed rearwardly of said bowl and journaled in connection with arms or brackets 8 rigid with the bowl and disposed on the outside of the same. These wheels are preferably provided with pneumatic tires arranged in dual form as shown in Fig. 1.

The front end of the scraper is supported by a swivel pony truck 9 provided with a tongue 10 whereby connection with a tractor may be made. An arm 11 is rigid with and projects upwardly and at a rearward angle from the relatively stationary frame 12 of the pony truck. Other arms 13 are rigidly secured to the arm 11 intermediate its ends and extend rearwardly and downwardly to pivotal connections with the sides of the walls 3 at the front and bottom, as shown at 14.

The upper end of the arm 11 is provided with transversely spaced upstanding sheave housings 15 rigid therewith. These housings straddle a beam 16 extending to the rear end of and above the bowl and pivoted at said end on an arched bracket 17 upstanding from the beam 2. The beam 16 rides on a roller 18 mounted on the arm 11 between the housings 15. Vertical sheaves 19 are mounted in said housings and other co-operating sheaves 20 are mounted on the beam 16 ahead of the arm 11, a horizontal direction changing sheave 21 for the control cable 22 being arranged in connection with the sheaves 20.

The cable is anchored at one end on the arm 11 and extends thence to and back and forth between the different sheaves 20, 19 and 21 in proper order, and thence to and about a vertical direction changing pulley 23 mounted on one side of the arm 11 intermediate its ends. From this pulley the cable passes to a winding drum unit on the tractor (not shown) but which is preferably of the type shown in my co-pending application for patent, Serial No. 512,979, filed February 2, 1931. By means of this arrangement it will be seen that a pull on the cable decreases the distance between the sheaves 19 on the arm 11 and the sheaves 20 on the beam 16, causing the arm 11 to be straightened up in a forward direction, turning about the wheel center of the pony truck as an axis.

Since the arms 13 are rigid with the arm 11, the pivots 14 and consequently the bowl itself will be raised. This raising movement is aided by the back push on the beam 16 imparted thereto by the pull on the cable, the structure turning on the rear wheels as an axis. The divided arrangement of the sheaves and the runs of the cable on opposite sides of the beam 16 insures a non-binding adjustment movement being imparted to the bowl structure. When the pull on the cable is released, the bowl drops of its own weight as will be evident and since with this type of scraper the weight of the bowl and associated parts is considerable, no means to force the blade 6 into the ground is necessary.

The rear wall or back end of the bowl is in the form of a movable endgate 24 depending from and mounted in rigid connection with a longitudinal beam 25 disposed centrally of the width of the bowl which is above the beams 1 and 2. The beam 25 is hollow and contains a strong compression spring 26. At its rear end this spring engages the rear end of the beam and at its forward end engages the head flange of a tubular member 27 about which the spring is disposed, and which is connected to a cable 28. This cable extends thence through the spring and beyond the rear end of the beam to an anchor bracket 29 mounted in fixed connection with and rearwardly of the bracket 17 as shown in Figs. 1 and 5. It will therefore be seen that the spring exerts a pressure to push the beam and endgate rearwardly and when the beam is pulled forwardly the spring of course resists such movement and becomes compressed.

Upstanding posts 30 are mounted on the endgate at its sides which carry rollers 31 engaging the top and bottom surfaces of the corresponding rails 4, and other rollers 32 engaging the inner vertical faces of the rails as shown in Figs. 5 and 6. Adjacent its forward end the beam 25 rides on rollers 33 mounted in connection with the front frame beam 1, and other rollers 34 also mounted in connection with said beam 1 bear against the sides of the beam 25. The top of the beam 25 is engaged on one side by an overhanging roller 35 supported on a short arm 36 upstanding from the beam 1 to one side of the beam 25 as shown in Figs. 1 and 7. The latter roller can only be used on one side however on account of the presence of the control cable on the opposite side of the beam 25 as later described.

Figure 3:
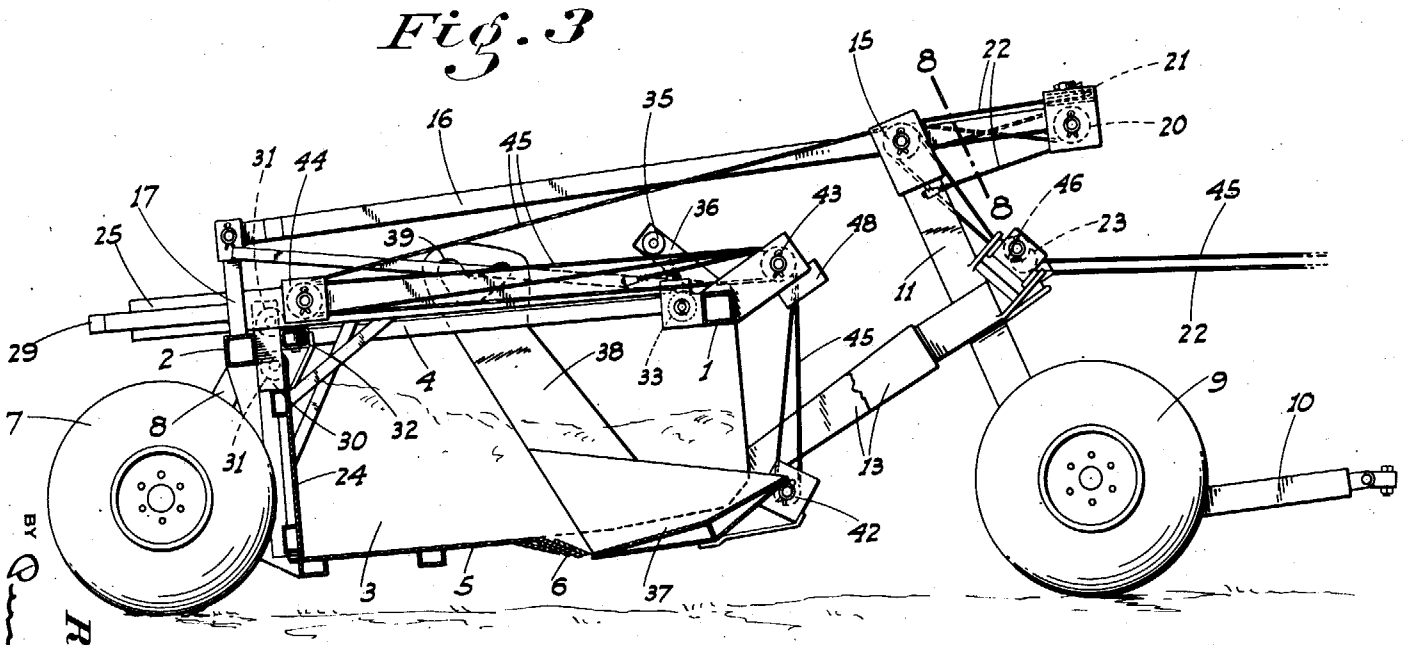
Fig. 3 is a similar view showing the scraper loaded and in transporting position.

Disposed between the main bowl-sides 3 ahead of the blade 6 is what may be properly termed an auxiliary bowl 37, which is of scoop-like form having an upward slope toward the front. This auxiliary bowl is rigid with a pair of strap arms 38 which project upwardly and rearwardly from the sides of the auxiliary bowl at its rear end. The upper ends of these arms are provided with slots 39 which are engaged by rollers or trunnions 40 mounted on posts 41 upstanding from the sides of the main bowl (see Fig. 6) and disposed rearwardly of the plane of the blade 6. The auxiliary bowl naturally tends to swing down of its own weight and the arms 38 are arranged so that when the trunnions 40 are engaged with the upper sides of the slots 39, the rear edge of the auxiliary bowl then engages the blade 6 forming a closure therewith as shown in Fig. 3 and making the main and auxiliary bowls a continuous dirt retaining unit.

The auxiliary bowl and endgate are connected together for movement in a certain relation to each other by the following means.

Secured on the front end of the auxiliary bowl is a sheave block 42, alined with a similar block 43 rigid with the beam 1 in front of the same and disposed to the side of the beam 25 opposite the roller arm 36. Mounted on said side of the beam 25 toward its rear end is another sheave block 44. A cable 45 passes fom the tractor power unit previously mentioned about a direction changing pulley 46 on the arm 11 to the side of the pulley 23 and thence over one of the sheaves 19 which serves to hold this portion of the cable away from the sheaves 43. The cable then extends to the rear sheave block 44, then about the sheaves of the blocks 43 and 42 and finally to an anchor 47 on the beam 25 rearwardly of said blocks as plainly shown. The multiplicity of sheave blocks and corresponding number of runs of cable thus had are employed in order to increase the leverage as will be evident.

By means of this arrangement it will be seen that a pull on the cable 45 exerts a forward pull on the beam 25 through the sheave block 44 and also exerts an upward pull on the auxiliary bowl through the sheave block 42. Since the weight of the auxiliary bowl when empty and consequently its resistance to upward movement is less than that offered by the spring 26 holding the endgate and beam 25 back, the auxiliary bowl will be lifted to its limit of movement before any movement will be imparted to the endgate. Such limit of movement is reached when the front end of the auxiliary bowl engages a stop 48 preferably mounted on and depending from the pulley block 43.

The same is true when the scraper is loaded since the dirt holding capacity of the auxiliary bowl is less than that of the main bowl. The resistance of the load of the auxiliary bowl and its weight is consequently less than that offered by the load in the main bowl and by the endgate, which latter resistance is increased by the natural pressure of the spring 26.

Figure 2:
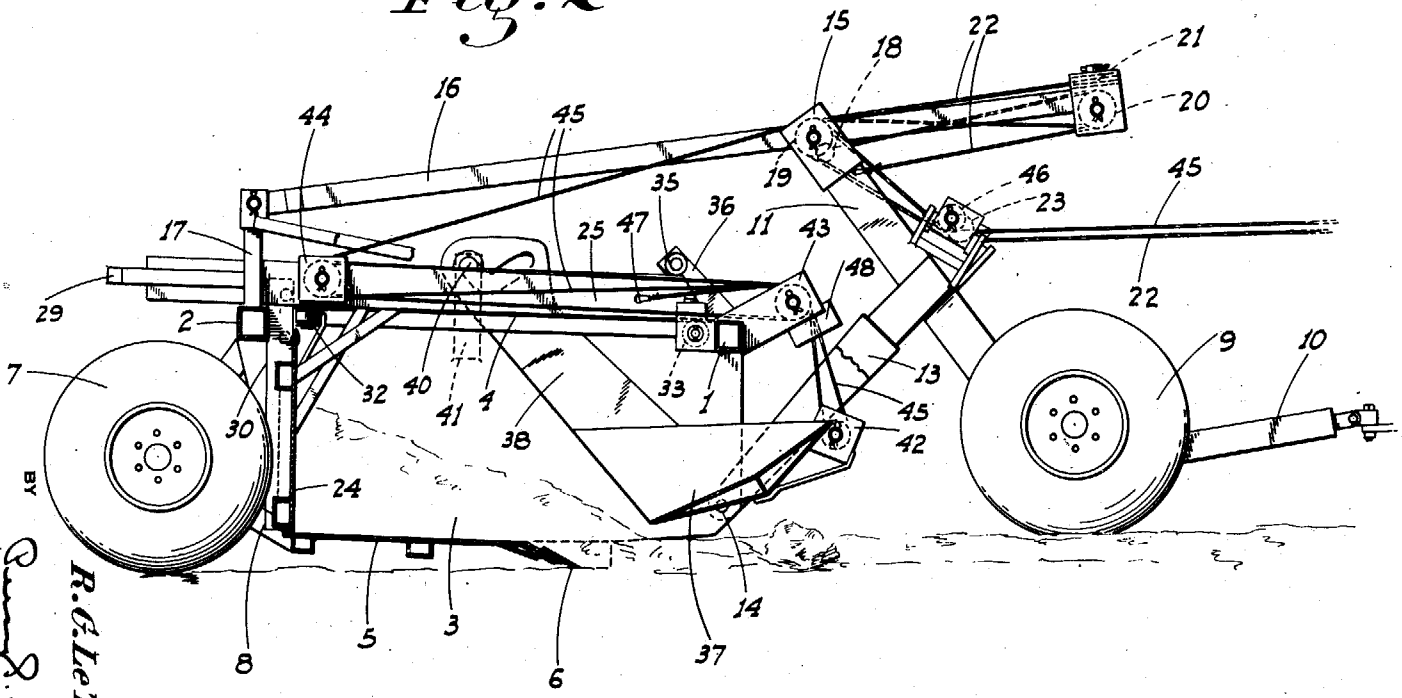
Fig. 2 is a sectional elevation of the same in loading position taken on the line 2—2 of Fig. 1.

In operation to load the scraper the blade 6 is lowered to the desired scraping level by suitable manipulation of the cable 22, while the auxiliary bowl is swung up somewhat or until it is above and in front of the blade 6 a suitable distance according to the character of the dirt being scraped and as shown in Fig. 2. The dirt naturally passes into the main bowl first and as the latter fills up and assumes a relatively steep slope at the front it begins to tumble forwardly rather than push further back, on account of the fact that there is less resistance to the latter movement of the dirt. As a result the front auxiliary bowl fills up likewise. If at any time during the filling of the bowls the bottom of the auxiliary bowl comes in contact with a large boulder or other relatively unyielding object, said auxiliary bowl can yield upwardly without danger on account of the presence of the slots 39 in the supporting arms 38.

Figure 4:
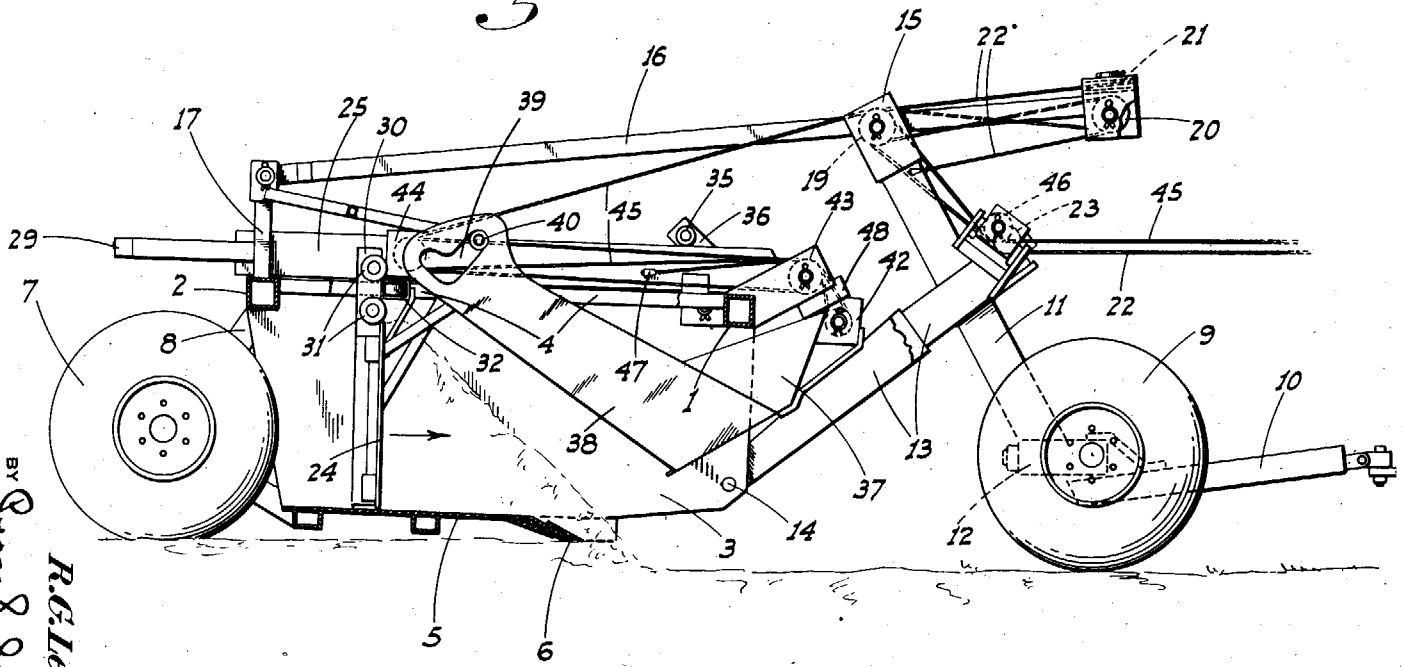
Fig. 4 is a similar view showing the scraper in its dumping position and taken on the line 4—4 of Fig. 1.

When the scraper is fully loaded the main bowl is raised to a transporting position by manipulation of the cable 22 and so that the blade 6 engages the adjacent rear edge of the auxiliary bowl as shown in Fig. 3. When it is desired to dump the load the scraper is adjustably set by manipulation of the cable 22 so that the blade 6 is at the desired level from the ground and the cable 45 is pulled to raise the auxiliary bowl to its topmost limit of movement as shown in Fig. 4. With such raising of the auxiliary bowl the gap between the blade 6 and the adjacent edge of the auxiliary bowl is increased so as to allow of a free flow of dirt and at the same time the arms 38 move back so that the trunnions 40 then lie at the opposite ends of the slots 39. This is due to the fact that the fixed sheaves 43 are rearwardly of the auxiliary bowl sheaves 42, so that a rearward push is then exerted on the auxiliary bowl and its supporting arms, and to the distribution of weight of the auxiliary bowl relative to the supporting cable coupled with the positioning of the slots relative to a vertical plane when the arms are swung up and forwardly. As a result the radius of turning of the auxiliary bowl is shortened and said bowl is pulled practically straight up during the latter part of its movement. This increases the dumping angle of the bowl 37 considerably without raising it to an excessive degree, and promotes quick and efficient dumping. Also, the arms 13 may be shorter than could otherwise be the case, and the entire implement is more compact.

As the auxiliary bowl is raised the dirt spills out of the same of itself and onto the ground in front of the blade 6 so that it is practically empty by the time said auxiliary bowl is fully raised. With a continued pull on the cable 45 the rear endgate then moves forwardly forcing the dirt over the blade 6 and onto the ground. Thus with the forward movement of the scraper there is practically no lapse between the discharge of dirt from the auxiliary and main bowls.

When the scraper is empty the slackening of pressure on the cable 45 permits the spring 26 to return the beam 25 and endgate back to their normal position, followed by a lowering of the auxiliary bowl to its normal position or to any desired level as controlled by the pressure on the cable and ready for further loading operations.

It should be noted that the center of the cable slot in the single sheave 21 is twice as far above the longitudinal central plane of the beam 16 as the center of the two sheaves 20 is below said plane. In this manner, the cable pressure on the sheaves 20 tending to pull the beam down is equalized by the pressure on the sheave 21 tending to pull the beam up, and as a result said beam is kept relatively floating.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

What is claimed is:

1. A scraper comprising a main bowl, an auxiliary bowl in front of the same, arms projecting upwardly from the auxiliary bowl, pivotal connections between the arms at their upper ends and the main bowl, and means applied to the auxiliary bowl to swing the same about the pivotal connections as an axis; said connections comprising trunnions fixed on the main bowl, the arms having longitudinal slots in which said trunnions ride.

2. A scraper comprising a main bowl, a forwardly movable rear endgate therein, an auxiliary bowl in front of the main bowl, means mounting said auxiliary bowl for upward and forward movement from its normal position, an operating means applied in common to the endgate and auxiliary bowl and arranged to both raise the latter and pull the endgate forwardly during unloading, and spring means yieldably resisting the forward movement of the endgate during unloading, but having sufficient strength to permit raising or lowering of said auxiliary bowl by said operating means during loading without requiring movement of said endgate by said operating means.

3. A scraper comprising a main bowl, a forwardly movable rear endgate therein, an auxiliary bowl in front of the main bowl, a single pull cable, and means connecting the cable to the endgate and auxiliary bowl to both pull the endgate forwardly and raise the auxiliary bowl, including spring means applied to the endgate to resist the forward movement thereof, the unloaded weight of the auxiliary bowl resisting the raising of the same being less than the resistance offered by the spring, whereby the auxiliary bowl can be raised and lowered a given amount during loading without requiring the endgate to be moved, and means positively limiting such raising movement.

4. A scraper including a bowl, wheels supporting the same at its rear end, forwardly extending arms pivoted on and supporting the bowl at its front end, and means applied to said arms to swing the same upwardly at their pivoted ends and also exerting a direct backward pressure on the back end of the bowl above the axis of the wheels.

5. A scraper including a bowl, wheels supporting the same at its rear end, a front wheel truck, an arm mounted on and upstanding from the truck, rearwardly extending arms rigid with said upstanding arm and pivoted at their rear ends on the bowl at its forward end, and means applied to said upstanding arm to swing the same forwardly whereby to raise the rear ends of said pivoted arms and thus tilt the bowl upwardly about the rear wheels as an axis.

6. A scraper including a bowl, wheels supporting the same at its rear end, a front wheel truck, an arm mounted on and upstanding from the truck, rearwardly extending arms rigid with said upstanding arm and pivoted at their rear ends on the bowl at its forward end, and means applied to said upstanding arm to swing the same forwardly and at the same time acting to exert a rearward pressure against the rear end of the bowl above the rear wheels.

7. A scraper including a bowl, wheels supporting the same at its rear end, a front wheel truck, an arm mounted on and upstanding from the truck, rearwardly extending arms rigid with said upstanding arm and pivoted at their rear ends on the bowl at its forward end, a beam mounted on the bowl at its rear end at a point above the rear wheels and extending forwardly to a termination ahead of said upstanding arm, and means between the front end of said beam and the upper end of said arm for pulling said ends toward each other.

8. A scraper including a bowl, wheels supporting the same at its rear end, a front wheel truck, an arm mounted on and upstanding from the truck, rearwardly extending arms rigid with said upstanding arm and pivoted at their rear ends on the bowl at its forward end, a beam mounted on the bowl at its rear end at a point above the rear wheels and extending forwardly to a termination ahead of said upstanding arm, sheaves fixed on the front end of said beam and on the upper end of the arm arranged in substantially horizontal alignment with each other, and a pull cable anchored on the arm and extending thence about and between the sheaves in a manner to cause a pull on the cable to draw the sheaves toward each other.

9. A scraper including a bowl, wheels supporting the same at its rear end, a front wheel truck, an arm mounted on and upstanding from the truck, rearwardly extending arms rigid with said upstanding arm and pivoted at their rear ends on the bowl at its forward end, a beam mounted on the bowl at its rear end at a point above the rear wheels and extending forwardly to a termination ahead of said upstanding arm, vertical sheaves on the upper end of the arm on opposite sides, sheaves aligned with said arm-sheaves mounted on the sides of the beam at its forward end and below the longitudinal central plane thereof, a horizontal sheave mounted on the beam above said central plane, and a pull cable anchored on the arm and extending thence about and between the various sheaves in a manner to cause a pull on the cable to draw the arm and beam sheaves toward each other; the cable groove on the horizontal sheave being twice as far above the central plane of the beam as the axis of the vertical beam-sheaves is below said plane.

10. A scraper comprising a bowl having front and rear sections normally spaced apart to form a gap between their adjacent ends and means mounting the forward section for upward movement in an initially vertical direction and a subsequent increasingly angular direction relative to the main bowl section.

11. A scraper comprising a bowl having front and rear sections normally spaced apart to form a gap between their adjacent ends, means applied to the front end of the forward section to raise such end, and pivot means mounting the forward section so that the action of said raising means will first cause said section to be lifted vertically with no appreciable arcuate movement, and then swung upwardly about the pivot means through an arc of relatively short radius with respect to the initial position of said pivot means on the section.

12. A scraper including a bowl, wheels supporting the same at its rear end, forwardly extending arms pivoted on and supporting the bowl at its front end, and means applied to the arms and to the bowl to swing the arms upwardly at their pivoted ends and at the same time exert a separate pressure directly on the bowl in a direction to raise the front end of the same.

13. In a scraper, a bowl having rails along its sides at the top and parallel to the bottom thereof, a rear endgate disposed between the sides, rollers mounted in connection with the endgate and engaging the horizontal and adjacent vertical faces of the rails, a horizontal beam extending lengthwise of the bowl above and rigid with the endgate, a cross beam on the bowl ahead of the endgate, rollers mounted in connection with the cross beam and guidingly engaging said first named beam, and means applied to said first named beam to move the same lengthwise.

14. In a scraper, a frame, a bowl supported therefrom, an auxiliary dirt retaining member in front of the bowl to co-operate therewith to receive some of the load scraped into the same, arms projecting upwardly from the member, transverse pivot elements on the frame, each arm having an L-shaped slot in which the corresponding element rides, one leg of the slot extending upwardly from the apex thereof at substantially a right angle to the bottom of the member while the other leg extends forwardly substantially parallel to said member, and means applied to the member to exert an upward and rearward pull thereon.

15. A scraper comprising a main bowl, a forwardly movable rear endgate therein, an auxiliary upwardly movable bowl in front of the main bowl, and a common operating means to both pull the endgate forwardly and raise the auxiliary bowl, and means acting in conjunction with said operating means to cause the functioning of the latter to raise the auxiliary bowl any desired amount during all loading operations without moving the endgate.

16. In a scraper of the class described, a main bowl having a cutting blade at its forward end, wheels for supporting the rear end of said main bowl, means for lowering said bowl to a digging and loading position, for raising said bowl to a carrying position and for adjusting said bowl to any intermediate position therebetween for striking off the load during discharge thereof, an auxiliary bowl in front of the main bowl and arranged relative thereto to be loaded in conjunction therewith, both bowls being adapted to discharge directly onto the ground at their adjacent ends, common operating means independent of said first-mentioned means for effecting the discharge of both bowls in predetermined order and for raising and lowering said auxiliary bowl independently of said main bowl, and means offering resistance to unloading movement of said main bowl so proportioned with respect to the force exerted by said common operating means as to insure raising and lowering of said auxiliary bowl during all loading operations without effecting unloading movement of said main bowl.

17. In a scraper of the class described, a main bowl having a cutting blade at its forward end, wheels for supporting the rear end of said main bowl, cable operated means for lowering said bowl to a digging and loading position, for raising said bowl to a carrying position and for adjusting said bowl to any intermediate position therebetween for striking off the load during discharge thereof, an auxiliary bowl in front of the main bowl and arranged relative thereto to be loaded in conjunction therewith, both bowls being adapted to discharge directly onto the ground at their adjacent ends, a single cable means independent of said first mentioned cable-operated means for raising and lowering said auxiliary bowl relative to said main bowl, and to effect the discharge of both bowls in predetermined order, and means offering resistance to unloading movement of said main bowl so proportioned with respect to the force exerted by said single cable means as to insure raising and lowering of said auxiliary bowl during all loading operations without effecting unloading movement of said main bowl.

18. In a scraper of the class described, a main bowl having a cutting blade at its forward end, wheels for supporting the rear end of said main bowl, cable-operated means for lowering said bowl to a digging and loading position, and for raising said bowl to a carrying position and for adjusting said bowl to any intermediate position therebetween for striking off the load during discharge thereof, an auxiliary bowl in front of the main bowl and arranged relative thereto to be loaded in conjunction therewith, both bowls being adapted to discharge directly onto the ground at their adjacent ends, a single cable means independent of said first mentioned cable-operated means for raising and lowering said auxiliary bowl relative to said main bowl, said last mentioned means permitting said auxiliary bowl to float freely in contact with the earth being loaded, or positioned in spaced relation thereabove, and being arranged to discharge both of said bowls in predetermined order, and means offering resistance to unloading movement of said main bowl so proportioned with respect to the force exerted by said single cable means as to insure raising and lowering of said auxiliary bowl during all loading operations without effecting unloading movement of said main bowl.

19. In a scraper of the class described, a main bowl having a cutting blade at its forward end and side walls extending forwardly of said cutting blade, wheels supporting the rear end of said main bowl, cable-operated means for lowering said bowl to a digging and loading position, for raising said bowl to a carrying position and for adjusting said bowl to any intermediate position therebetween for striking off the load during discharge thereof, an auxiliary bowl in front of the cutting blade of said main bowl and positioned between said forwardly extending side walls, said auxiliary bowl being arranged relative to said main bowl so as to be loaded in conjunction therewith, both bowls being adapted to discharge directly onto the ground at their adjacent ends, cable means independent of said first mentioned cable-operated means for raising and lowering said auxiliary bowl relative to said main bowl, said last mentioned means permitting said auxiliary bowl to float freely in contact with the earth being loaded, or positioned in spaced relation thereabove and being arranged to discharge both of said bowls in predetermined order, and means offering resistance to unloading movement of said main bowl so proportioned with respect to the force exerted by said second-mentioned cable means as to insure raising and lowering of said auxiliary bowl during all loading operations without effecting unloading movement of said main bowl.

20. In a scraper of the class described, a main bowl having side walls, a cutting blade at the forward end of said bowl, wheels supporting the rear end of said main bowl, cable-operated means for lowering said bowl to a digging and loading position, for raising said bowl to a carrying position and for adjusting said bowl to any intermediate position therebetween for striking off the load during discharge thereof, an auxiliary bowl pivoted to the side walls of said main bowl and positioned in front thereof and arranged relative thereto to be loaded in conjunction therewith, both bowls being adapted to discharge directly onto the ground at their adjacent ends, a forwardly movable endgate in said main bowl, yieldable means for positioning said endgate normally at the rear end of said main bowl, and a single cable means independent of said first mentioned cable-operated means for raising and lowering said auxiliary bowl relative to said main bowl during all loading operations of said bowls without overcoming the resistance offered by said yieldable means, said last mentioned means being connected also to said endgate whereby both of said bowls are discharged in predetermined order by tension on said last mentioned cable means.

21. In a scraper of the class described, a main bowl having side and bottom walls, a cutting blade fixed at the forward end of said bottom wall, wheels for supporting the rear end of said main bowl, cable-operated means for lowering said bowl to a digging and loading position, for raising said bowl to a carrying position and for adjusting said bowl to any intermediate position therebetween for striking off the load during discharge thereof, an auxiliary bowl in front of the main bowl and arranged relative thereto to be loaded in conjunction therewith, both bowls being adapted to discharge directly onto the ground at their adjacent ends, a forwardly movable endgate in said main bowl for positively ejecting the load therein, yieldable means for positioning said endgate normally at the rear end of said main bowl, and cable means independent of said first mentioned cable-operated means for raising and lowering said auxiliary bowl relative to said main bowl during all loading operations of said bowls without overcoming the resistance offered by said yieldable means, said last mentioned means being connected also to said endgate whereby a pull on said cable will first raise and dump said auxiliary bowl and a further pull on said cable will move said endgate forwardly and thereby scrape the load from the side and bottom walls of said main bowl.

22. In a scraper of the class described, a main bowl having a cutting blade at its forward end, wheels for supporting the rear end of said main bowl, means for lowering said bowl to a digging and loading position, for raising said bowl to a carrying position and for adjusting said bowl to any intermediate position therebetween for striking off the load during discharge thereof, an auxiliary bowl pivoted to and positioned in front of the main bowl and arranged relative thereto to be loaded in conjunction therewith, both bowls being adapted to discharge directly onto the ground at their adjacent ends, common means independent of said first mentioned means for raising and lowering said auxiliary bowl independently of said main bowl and to effect the discharging of both bowls in predetermined order, and means offering resistance to unloading movement of said main bowl so proportioned with respect to the force exerted by said common means as to insure raising and lowering of said auxiliary bowl during all loading operations without effecting unloading movement of said main bowl.

23. In a scraper of the class described, a main bowl having a cutting blade at its forward end, wheels for supporting the rear end of said main bowl, cable operated means for lowering said bowl to a digging and loading position, for raising said bowl to a carrying position and for adjusting said bowl to any intermediate position therebetween for striking off the load during discharge thereof, an auxiliary bowl pivoted to and positioned in front of the main bowl and arranged relative thereto to be loaded in conjunction therewith, both bowls being adapted to discharge directly onto the ground at their adjacent ends, a single cable means independent of said first mentioned cable-operated means for raising and lowering said auxiliary bowl relative to said main bowl and to effect the discharge of both bowls in predetermined order, and means offering resistance to unloading movement of said main bowl so proportioned with respect to the force exerted by said single cable means as to insure raising and lowering of said auxiliary bowl during all loading operations without effecting unloading movement of said main bowl.

ROBERT G. LE TOURNEAU.